United States Patent
Srinivas et al.

(10) Patent No.: US 9,032,358 B2
(45) Date of Patent: May 12, 2015

(54) INTEGRATED CIRCUIT FLOORPLAN FOR COMPACT CLOCK DISTRIBUTION

(71) Applicant: QUALCOMM Incorporated, San Diego, CA (US)

(72) Inventors: Vaishnav Srinivas, San Diego, CA (US); Robert Won Chol Kim, San Marcos, CA (US); Philip Michael Clovis, San Diego, CA (US); David Ian West, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/787,647

(22) Filed: Mar. 6, 2013

(65) Prior Publication Data

US 2014/0253228 A1    Sep. 11, 2014

(51) Int. Cl.
   *G06F 17/50* (2006.01)
   *H01L 27/02* (2006.01)

(52) U.S. Cl.
   CPC ........ *H01L 27/0207* (2013.01); *G06F 17/5072* (2013.01); *G06F 2217/40* (2013.01)

(58) Field of Classification Search
   USPC ........................................................ 716/137
   See application file for complete search history.

(56) References Cited

U.S. PATENT DOCUMENTS

| | | | |
|---|---|---|---|
| 6,133,750 A | 10/2000 | Chan et al. | |
| 6,467,074 B1 | 10/2002 | Katsioulas et al. | |
| 6,671,865 B1 | 12/2003 | Ali et al. | |
| 7,073,147 B2 * | 7/2006 | Ikeda et al. | 716/120 |
| 7,098,691 B2 | 8/2006 | Or-Bach et al. | |
| 2006/0071691 A1 | 4/2006 | Garlepp | |
| 2006/0080632 A1 * | 4/2006 | Ng et al. | 716/17 |
| 2006/0236175 A1 | 10/2006 | Usami et al. | |
| 2007/0247189 A1 | 10/2007 | Phil et al. | |
| 2011/0260318 A1 | 10/2011 | Eisenstadt | |

FOREIGN PATENT DOCUMENTS

EP    1742363 A2    1/2007

OTHER PUBLICATIONS

International Search Report and Written Opinion—PCT/US2014/018792—ISA/EPO—May 22, 2014.

* cited by examiner

*Primary Examiner* — Paul Dinh
*Assistant Examiner* — Bryce Aisaka
(74) *Attorney, Agent, or Firm* — Arent Fox LLP

(57) ABSTRACT

An integrated circuit includes core logic and a plurality of interface blocks disposed about a periphery of the core logic. A plurality of input or output (I/O) circuits is assigned to one of the plurality of interface blocks. The I/O circuits include external I/O circuits coupled to a device other than the integrated circuit and internal I/O circuits coupled to the integrated circuit. Each interface block includes a first plurality of I/O circuits disposed on a first side of the interface block and a second plurality of I/O circuits disposed on a second side of the interface block. Each interface block also includes interface logic for the interface block between the first plurality of I/O circuits and the second plurality of I/O circuits, and a logic hub that includes a clock distribution of minimal length that drives launch logic and capture logic to form the I/O circuits of the interface block.

26 Claims, 4 Drawing Sheets

INTEGRATED CIRCUIT FLOORPLAN FOR COMPACT CLOCK DISTRIBUTION

BACKGROUND

1. Field

The present disclosure relates generally to an electrical assembly having a dense input/output requirement, and more particularly, to providing physical connectivity in high density integrated circuits.

2. Background

A typical integrated circuit (IC) is provided in a package that provides connections for coupling various circuit elements of the IC to a system bus, control circuits, or other devices. The IC is typically disposed upon a substrate, underneath which may be an array of solder balls of a ball grid array (BGA), or an array of copper pillars arranged in a predetermined pattern. When mounted to a printed circuit board (PCB) or printed wiring board (PWB), each solder ball or copper pillar provides an electrical connection between an electrical node within the electronic device of the package and a corresponding electrical node on the PCB/PWB. Accordingly, the PCB/PWB on which the package is mounted typically has an array of contacts which matches the footprint of the package. Input and output circuits of the IC are generally arranged to be physically proximate to corresponding input and output contacts in the array of contacts.

The package may be mounted by placing the package on a surface of the PCB/PWB, with the solder balls or copper pillars aligned with the corresponding array of contacts on the PCB/PWB. The assembly may then be heated in a reflow oven to melt the solder balls or copper pillars to thereby provide mechanical and electrical connections between each solder ball or copper pillar and the corresponding contact on the PCB/PWB.

SUMMARY

An electrical assembly, e.g., integrated circuit (IC), having a small footprint for package design, module design, and consumer product design is provided. In one aspect, the IC includes core logic and a plurality of interface blocks disposed about a periphery of the core logic. A plurality of input or output (I/O) circuits are assigned to one of the plurality of interface blocks. The I/O circuits include external I/O circuits adapted to be coupled to a device other than the integrated circuit and internal I/O circuits adapted to be coupled to the integrated circuit. Each interface block includes a first plurality of I/O circuits disposed on a first side of the interface block and a second plurality of I/O circuits disposed on a second side of the interface block, the second side being different from the first side. Each interface block also includes interface logic for the interface block between the first plurality of I/O circuits and the second plurality of I/O circuits, and a logic hub of the interface logic that includes a clock distribution of minimal length that drives launch logic and capture logic to form the I/O circuits of the interface block.

In another aspect, a method includes assigning I/O circuits of an integrated circuit to one of a plurality of interface blocks, wherein the I/O circuits include external I/O circuits coupled to a device other than the integrated circuit and internal I/O circuits coupled to interface logic of the integrated circuit. For each interface block, the method further includes disposing a first plurality of I/O circuits on a first side of the interface block and a second plurality of I/O circuits on a second side of the interface block, the second side being different from the first side, and providing interface logic for the interface block between the first plurality of I/O circuits and the second plurality of I/O circuits. The interface logic for the interface block comprises a logic hub that includes a clock distribution of minimal length that drives launch logic and capture logic to form the I/O circuits of the interface block.

DETAILED DESCRIPTION

Figure 1:
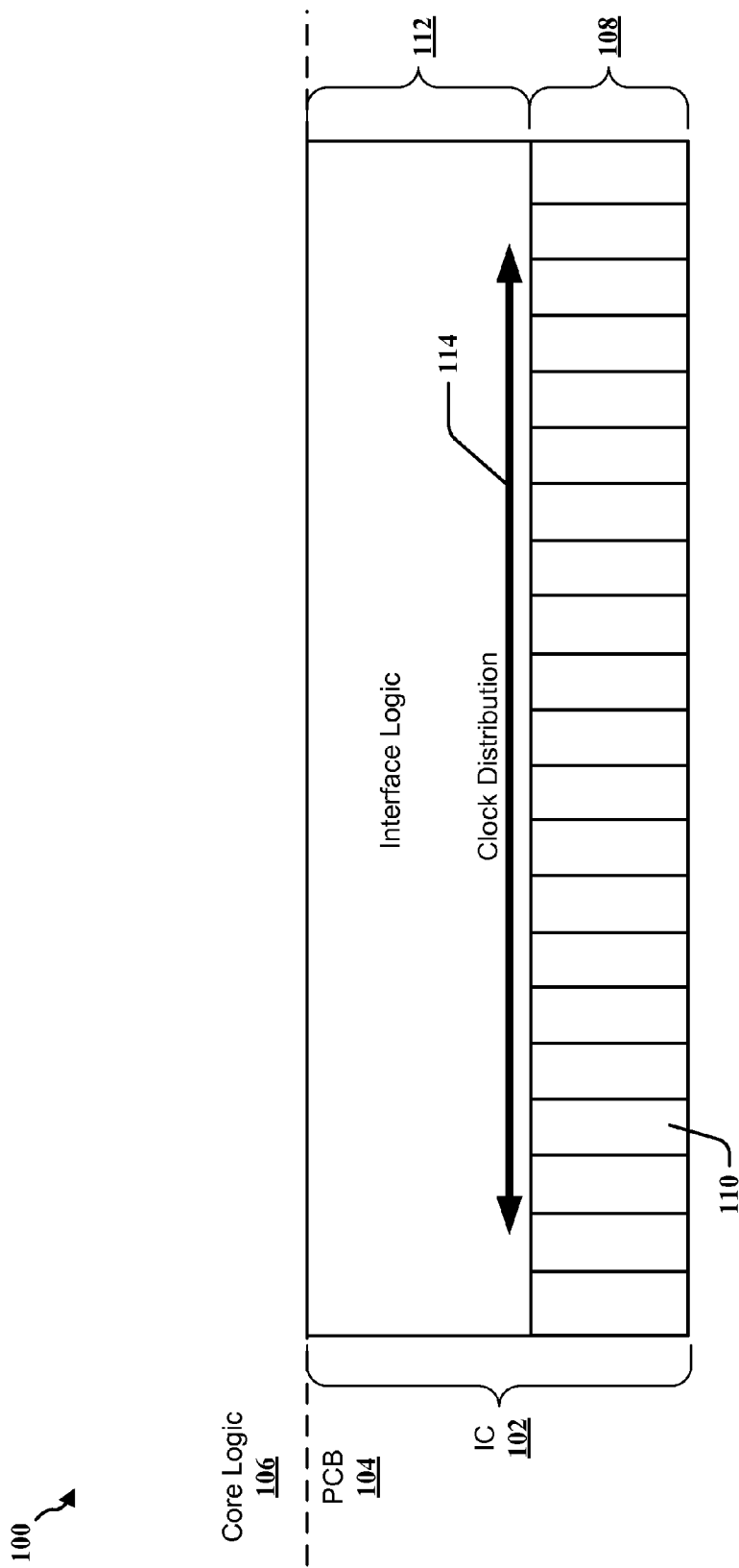
FIG. 1 is a diagram illustrating an interface block of an IC.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of electrical assemblies, ICs, and IC packaging will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements").

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or non-volatile memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As the demand for high performance devices implementing IC technology has increased so has the demand for increased functionality, speed, and portability of the devices. In connection with increasing performance and functionality of consumer electronics, maximum functional integration of the IC devices in an assembly having the smallest footprint, lowest profile, and lowest cost is desired. However, as functionality increases, the number of IC and passive electrical components in the assembly increases dramatically, thus threatening the objective of a smaller-sized assembly due to issues related to interconnecting ICs. In one example, double data rate synchronous dynamic random-access memory (DDR SDRAM) commonly have bit widths of 64 bits or more (72 bits or more with error correction) for data paths that must support data rates that are at least double the data rates of core logic of the DDR SDRAM IC. The high data rates and demands for particular physical alignment of inputs and outputs (I/Os) create serious challenges to DDR designers and designers of other types of IC.

Challenges faced by IC designers include issues associated with clock distribution. In SDRAM, data storage areas may be divided into several banks that may be controlled to provide an interleaved I/O, which allows core logic and data storage to operate at lower frequencies that the I/O provided to an external system bus. For DDR SDRAM to operate properly, close synchronization is typically required between input I/O clocks and with core logic clocks. I/Os are typically aligned with a physical layout of a ball grid array (BGA), or copper pillar bumps of the IC, resulting in an elongated physical structure that requires transmission of clock signals over long distances, measured in relation to the wavelength of the clock signals (e.g., a 10 Gigahertz signal has an approximate 3 centimeter wavelength) and to the width of the transmission lines carrying the clock signals. Additional circuitry is generally required to compensate for increased impedances associated with longer transmission lines that can give rise to increased jitter.

In an aspect of the disclosure, a method and structure for providing dense physical I/O on an IC using a clock tree with reduced clock distribution spans may reduce clock jitter while reducing circuit complexity and enabling centralized distribution of higher frequency clocking. Certain aspects of the method and structure enable a designer to more closely align system defined physical I/O layout requirements with I/O circuitry provided on die or IC chips, while reducing a total number of electronic circuits.

FIG. 1 is a diagram 100 illustrating an IC 102 mounted on a PCB 104 adjacent a core logic 106. The IC 102 includes a conventional physical I/O section 108 formed of a long row of thin I/O circuits 110, and an interface logic 112. The I/O section 108 is positioned on a substrate (not shown) so as to align the I/O circuits 110 with an electrical connection element array (not shown), such as a BGA layout or a copper pillar layout. In FIG. 1, the electrical connection element array is on the underside of the IC 102 and is thus not visible. Due to the long arrangement of the I/O circuits 110, a clock distribution 114 for the physical I/O section 108 is also relatively long. As such, clocks must typically be driven with greater power and additional circuits may be required to compensate for phase, delay, and other distortions of clock signals transmitted between the I/O circuits 108.

Figure 2:
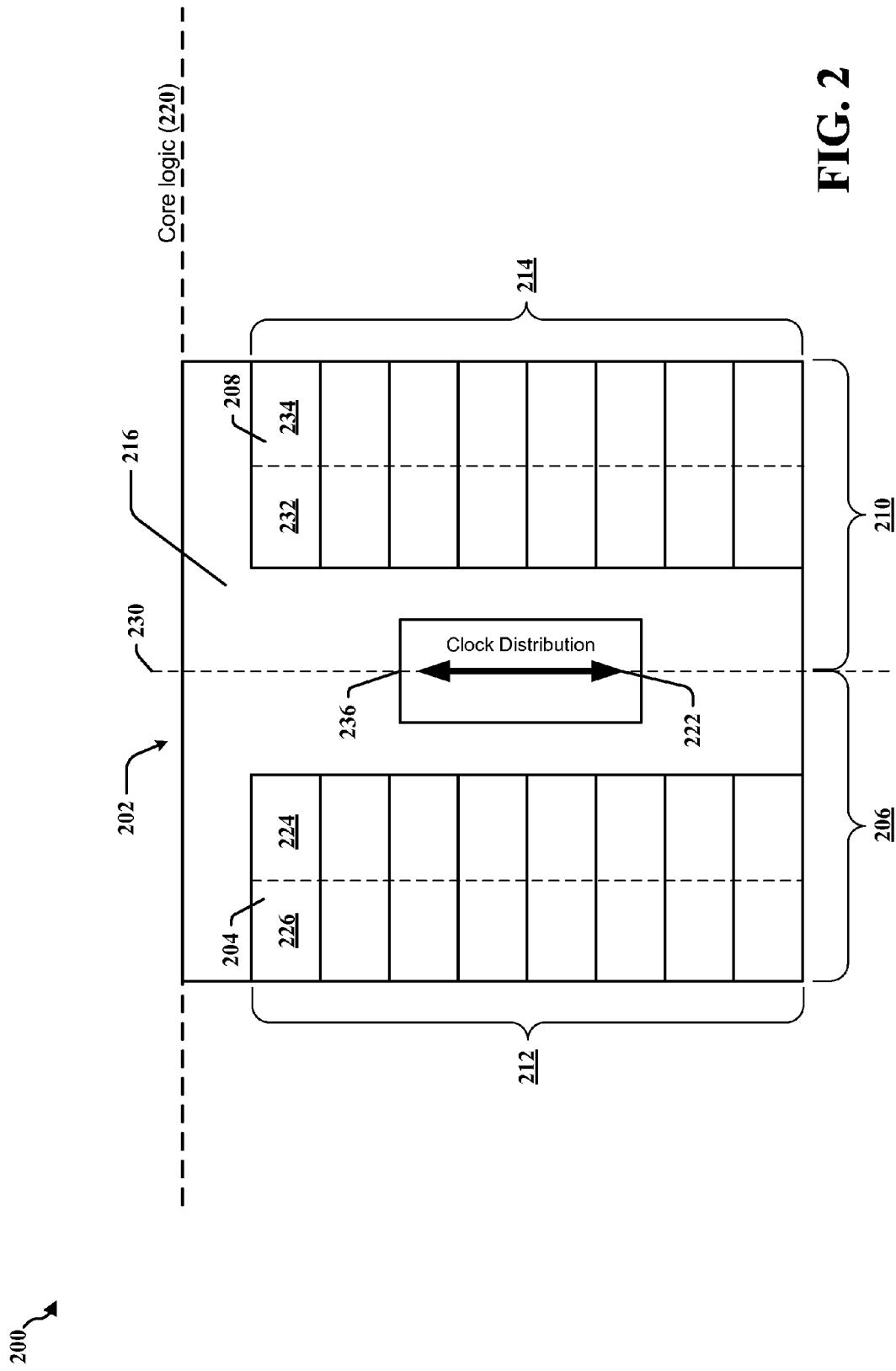
FIG. 2 is a diagram illustrating an interface block configured according to certain aspects of the present disclosure.

FIG. 2 is a diagram 200 that illustrates an example of an interface block 202 that may be employed in an IC design to provide a physical I/O for I/O circuits using a compact clock tree, and thereby to reduce clock skew in the IC. The interface block 202 may be provided as a predefined cell usable in an application-specific integrated circuit (ASIC) design. In the example depicted, the interface block 202 has a "butterfly" configuration having wings comprising a first plurality of I/O circuits 204 disposed on a first side 206 of the interface block 202, and a second plurality of I/O circuits 208 disposed on a second side 210 of the interface block 202. The first side 206 is different from the second side 210. The first and second pluralities of I/O circuits 204, 208 are thus arranged in two columns 212, 214 on opposite sides of the interface block 202 and are separated by a body comprising interface logic 216 that is located between the first and second pluralities of I/O circuits 204, 208.

Typically, the I/O circuits 204, 208 of at least one of the columns 212, 214 comprise I/O elements, such as line drivers, voltage shifters, buffers and gating logic configured to respond to input signals provided to the IC and/or to transmit output signals of the IC. In one example, interface block 202 may be configured to receive address signals transmitted to a double data rate synchronous dynamic random-access memory (DDR SDRAM).

I/O elements of the I/O circuits 204, 208 are coupled to either of the interface logic 216 or a device other than the IC. I/O elements coupled to a device other than the IC are referred to herein as "exterior I/O elements." More specifically, exterior I/O elements may be electrically connected to a separate device distinct from the IC, for example, via a copper pillar, and may be configured to receive signals from the separate device and/or to transmit signals to the distinct device. I/O elements coupled to the IC are referred to as "internal I/O elements." The I/O circuits 204, 208 themselves, may be bifurcated into an interior side and an exterior side. For example, each of the first plurality of I/O circuits 204 in the first column 212 may have an interior side 224 where interior elements are resident, and an exterior side 226 where exterior elements are resident. The interior side 224 and exterior side 226 are with reference to a center axis 230 of the interface block 202, wherein the interior side is closer to the axis. Likewise, each of the second plurality of I/O circuits 208 in the second column 214 may have an interior side 232, and an exterior side 234. Given the respective arrangement of the interior and exterior sides of the I/O circuits in the first and second columns, the interior/exterior arrangement of an I/O circuit in the first column may be described as mirroring the interior/exterior arrangement of an I/O circuit in the second column. This mirrored relationship is with respect to I/O circuit geography, e.g., interior/exterior sides, and not necessarily with respect to the functionality of the I/O elements associated with the interior/exterior sides. For example, the I/O elements in the exterior side 226 of a first I/O circuit 204 in the first column 212 may not be the same type of I/O elements in the exterior side 234 of a second I/O circuit 208 in the second column 214.

The interface logic 216 includes a logic hub 236 that includes a clock distribution 222 of minimal length that drives launch logic and capture logic to and from the I/O circuits. The clock distribution 222 is of minimal length relative to the clock distribution shown in FIG. 1. The minimal length is possible due to the butterfly arrangement of the I/O circuits 204, 208. Considering that the interface block 202 is synchronous, having data signals timed to a common clock, the "launch logic" ensures that the data signals are generated at the same time (relatively) with respect to a common clock edge. Minimizing the skew among data signals is important for high frequency. Short and balanced clock distribution allows for minimal skew among the data signals. Similarly, the "capture logic" ensures that data signals are sampled at the same time.

At least a portion of the interface logic 216 may be configured to condition the address signals and to control other aspects of operation of the I/O circuits 204, 208 in the columns 212, 214. For example, an interface block 202 may be configured to handle data signals, which may include multiplexed and/or bidirectional signals, and the interface logic 216 may control the operation of the interface block 202 based on one or more system clocks.

Interface logic 216 may perform any of a variety of logic functions that control and respond to I/O circuits 204, 208 and timing signals provided by core logic 220 of an IC. The interface logic 216 may comprise voltage level translation (from an I/O power domain to a core logic power domain) circuits, clock generation, doubling, dividing, etc., and other functions which may be implemented in some combination of analog and/or digital circuits.

Timing and control signals may be exchanged between the core logic 220 and the interface logic 216 through the logic hub 236. Timing signals may include one or more clock signals and the compacted nature of the butterfly interface block 202 can minimize the physical length of the clock tree of an IC relative to conventional elongated clock distributions, such as shown in FIG. 1. A shorter clock distribution 222 may be used when the I/O circuits 204, 208 are arranged in the interface block 202, as shown in FIG. 2.

In one example, each column 212, 214 may comprise eight I/O circuits 204, 208, in what may be referred to herein as a pair of byte wings attached to interface logic 216 in a "butterfly cell" 202. In another example, four I/O circuits 204, 208 may be provided in each column 212, 214. The number of I/O circuits 204, 208 in each column 212, 214 is typically selected based on application-specific requirements, and may be based on the functions performed by the interface block 202 and/or individual I/O circuits 204, 208. The number of I/O circuits 204 in its respective column 212 is not necessarily identical to the number of I/O circuits 208 in its respective column 214.

I/O circuits 204, 208 may be of different types and may include circuits that perform one or more functions. A first type of I/O circuit may comprise level shifting circuits and electrostatic discharge (ESD) circuits and may be deployed to drive an input or output signal of an IC through a pad or other connection to an external circuit board or chip carrier, etc. A second type of I/O circuit may comprise circuits configured to interface with logic elements of core logic 220 of an IC. It will be appreciated that the core logic 220 of an IC may operate using signals of significantly different voltage levels and may be clocked at significantly different clock rates than logic handling I/O signals received or transmitted through one or more of the I/O circuit elements 204, 208 of an interface block 202. Certain I/O circuits may be used for interface control signals, which may be unidirectional, while other I/O circuits may be employed for data transfer purposes and may be bidirectional.

Figure 3:
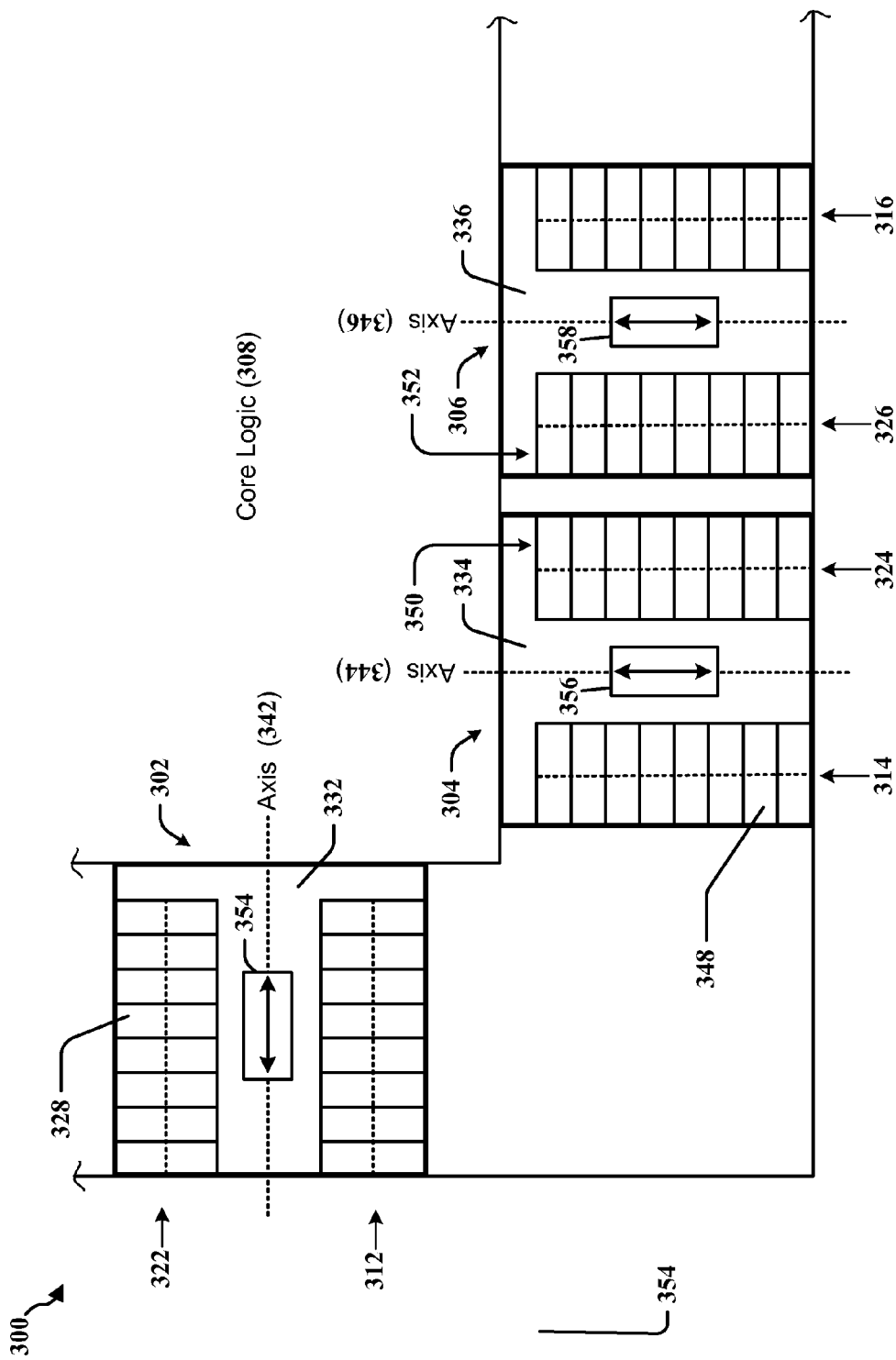
FIG. 3 is a diagram illustrating an IC configured according to certain aspects of the present disclosure.

FIG. 3 is a drawing 300 illustrating a portion of a physical interface of an IC including first, second and third interface blocks 302, 304, 306 arranged with respect to a core logic 308. The interface blocks 302, 304, 306 are similar to the interface block 202 of FIG. 2. Each interface block 302, 304, 306 has a centrally located interface logic 332, 334, 336, a portion of which shares a boundary with the core logic 308. The specific functional assignments of I/O circuits in columns 312, 314, 322, 324, 316 and 326 may be defined to match locations of I/O pads with I/O circuits. It will be appreciated that the use of butterfly interface blocks 302, 304, and 306 can greatly reduce the physical length of a clock tree.

According to certain aspects, the geometry and/or internal arrangement of each interface block 302, 304, 306 may be different from one or more of the other interface blocks 302, 304, 306. For example, the first interface block 302 may be oriented along an axis 342 that is substantially perpendicular with respect to the axes 344, 346 of the second and third interface blocks 304, 306, in order to provide an adjacent boundary between the core logic 308 and the interface logics 332, 334, 336.

In some embodiments, the same fabrication processes may be applied to the first interface block 302 as is applied to the second and third interface blocks 304, 306, while the orientation of the I/O circuits, e.g., elements 328 and 348, and the corresponding interior/external arrangement of the circuit elements of the I/O circuits 328, 348 may be maintained in alignment as desired. For example, the orientation of polysilicon elements (poly orientation) may be identical for I/O elements in both I/O circuits 328, 348 by creating each I/O circuit from a number of interconnected square portions.

In some embodiments, adjacent columns of I/O circuits of adjacent interface blocks may comprise external I/O elements of a same or similar type. In one example, a first interface block 304 and a second interface block 306 are arranged such that the external side 350 of the left column 324 of the first interface block is adjacent the external side 352 of the right column 326 of the second interface block 306. These external sides 350, 352 may comprise I/O elements that are ESD protected and that operate at higher voltage and/or frequency levels. Deployment of I/O elements of the same type in close proximity may lead to improvements in manufacturing process efficiency through the use of shared elements, such as ESD protection of power supplies and/or the provision of power through shared power rails.

It will be appreciated that clock distribution, power supply distribution and the distribution of other signals with the core logic can be simplified using the interface blocks 302, 304, 306 described herein. The maximum transmission path length associated with each interface block 302, 304, a 306 can be standardized and/or controlled, enabling rapid development of circuit designs. In particular, the function and response of each interface block 302, 304, 306 can be characterized and certain aspects of the layout may be automated as a result. Moreover, the configuration of the interface blocks 302, 304, 306 provides for positioning of the I/O circuits in close proximity to pads that receive solder balls and/or copper posts thereby reducing interconnect complexity. One or more of interface blocks 302, 304, 306 can be disposed adjacent to or around through-silicon vias (TSVs) as needed. Furthermore, alternative arrangements of I/O contacts may be employed to reduce on-chip and/or chip carrier interconnects.

Figure 4:
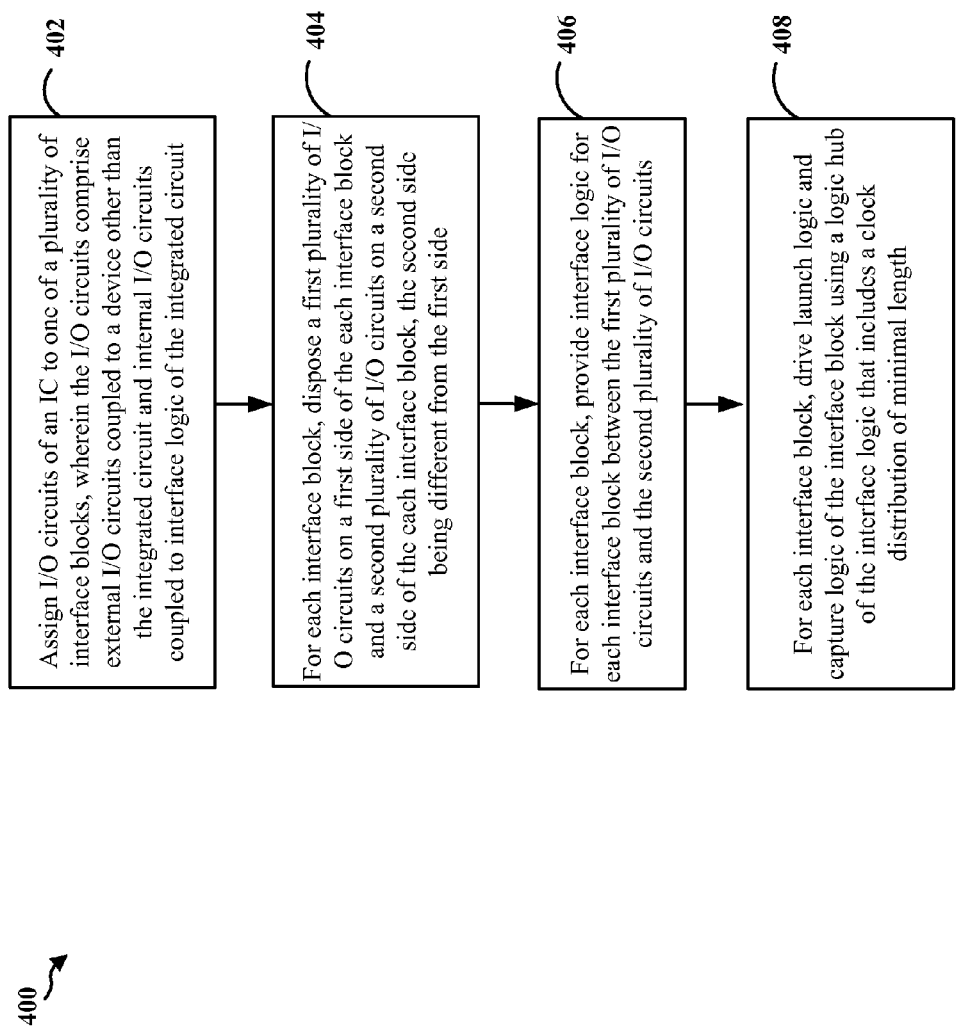
FIG. 4 is a flowchart illustrating a method of providing a floor plan for dense physical inputs and outputs to enable compact clock distribution.

With reference to FIG. 4, a method for providing a floor plan that enables an optimized clock distribution within an IC is presented. At step 402, I/O circuits 312, 314, 316, 322, 324, 326 of an IC are assigned to one of a plurality of interface blocks. The I/O circuits 312, 314, 316, 322, 324, 326 include external I/O circuits coupled to a device other than the IC and internal I/O circuits coupled to interface logic 332, 334, 336 of the IC. The I/O circuits 312, 314, 316, 322, 324, 326 may include I/O elements, such as line drivers, voltage shifters, buffers and gating logic configured to respond to input signals provided to the IC and/or to transmit output signals of the IC.

At step 404, for each interface block 302, 304, 306, a first plurality of I/O circuits is disposed on a first side, e.g. left or right side, of the interface block and a second plurality of I/O circuits are disposed on a second side of the interface block. The second side of the interface block is different from the first side, and in one configuration is opposite the first side relative to a center axis of the interface block 302, 304, 306.

At step 406, for each interface block, 302, 304, 306, interface logic 332, 334, 336 is provided between the first plurality of I/O circuits and the second plurality of I/O circuits. The interface logic 332, 334, 336 includes a logic hub 354, 356, 358 that includes a clock distribution of minimal length. At step 408, for each interface block, launch logic and capture logic of the interface block 302, 304, 306, is driven to form the I/O circuits 328, 348, of the interface block using the logic hub 354, 356, 358 of the interface logic that includes the clock distribution.

In some embodiments, each interface block 302, 304, 306 occupies a substantially rectangular area of the IC. Each interface block 302, 304, 306 may occupy a substantially square area of the IC. In some embodiments, a plurality of I/O circuits 204, 208 of an interface block 202 include interior elements 224, 232 on an interior side of the I/O circuit near an axis of the interface block, and exterior elements 226, 234 on an exterior side of the I/O circuit opposite both the interior side and the axis. The plurality of interface blocks may be arranged such as shown in FIG. 3, so that an exterior side of a first interface block is adjacent an exterior side of a second interface block.

In some configurations, an interface block 202 includes a first plurality of I/O circuits 204 on a first side 206 of the interface block that include interior elements 224 on an interior side of the I/O circuit near an axis 230 of the interface block, and exterior elements 226 on an exterior side of the I/O circuit opposite both the internal side and the axis. The interface block 202 may also include a second plurality of I/O circuits 208 on a second side 210 of the interface block that include interior elements 232 on an interior side of the I/O circuit near the axis 230 of the interface block, and exterior elements 234 on an exterior side of the I/O circuit opposite both the internal side and the axis.

In some embodiments, the core logic 308 is disposed within an area defined by at least two peripheral sides. At least one interface block 302, 304, 306 may be arranged on each of the at least two sides. The at least two sides may include two sides that are substantially perpendicular to one another. The control logic 308 may be disposed along an axis of each interface block. At least one interface block may be arranged on each the at least two sides by rotating an orientation of an axis of a first interface block by 90 degrees with respect to an orientation of an axis of a second interface block. The input circuits and output circuits of the first and second interface blocks may have the same or a different poly orientation.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method comprising:
    assigning input or output (I/O) circuits of an integrated circuit to one of a plurality of interface blocks, wherein the I/O circuits comprise external I/O circuits coupled to a device other than the integrated circuit and internal I/O circuits coupled to interface logic of the integrated circuit; and
    for each interface block,
        disposing a first plurality of I/O circuits on a first side of the interface block and a second plurality of I/O circuits spaced apart from the first plurality of I/O circuits and on a second side of the interface block opposite the first side of the interface block, the first plurality of I/O circuits and the second plurality of I/O circuits defining an exterior of the interface block, and
        providing interface logic for the interface block, the interface logic comprising a region located between the first plurality of I/O circuits and the second plurality of I/O circuits, said region defining an interior of the interface block;
        wherein the interface logic for the interface block comprises a logic hub at the interior of the interface block, the logic hub including a clock distribution of minimal length that distributes clock signals from the interior of the interface block toward the first plurality of I/O circuits and the second plurality of I/O circuits at the exterior of the interface block, the clock signals to drive launch logic and capture logic to and from the I/O circuits of the interface block.

2. The method of claim 1, wherein each interface block occupies a substantially rectangular area of the integrated circuit.

3. The method of claim 1, wherein each interface block occupies a substantially square area of the integrated circuit.

4. The method of claim 1, wherein at least one of the external I/O circuits includes an electrostatic discharge circuit.

5. The method of claim 4, wherein none of the internal I/O circuits includes an electrostatic discharge circuit.

6. The method of claim 1, wherein for each interface block, a plurality of I/O circuits of the interface block comprise interior elements on an interior side of the I/O circuit near an axis of the interface block, and exterior elements on an exterior side of the I/O circuit opposite both the interior side and the axis.

7. The method of claim 6, further comprising arranging the plurality of interface blocks such that an exterior side of a first interface block is adjacent an exterior side of a second interface block.

8. The method of claim 1, wherein for at least one interface block:
    the first plurality of I/O circuits on the first side of the interface block comprise interior elements on an interior side of the I/O circuit near an axis of the interface block, and exterior elements on an exterior side of the I/O circuit opposite both the internal side and the axis; and
    the second plurality of I/O circuits on the second side of the interface block comprise interior elements on an interior side of the I/O circuit near the axis of the interface block, and exterior elements on an exterior side of the I/O circuit opposite both the internal side and the axis.

9. The method of claim 1, wherein core logic is disposed within an area defined by at least two sides, and further comprising arranging at least one interface block on each of the at least two sides.

10. The method of claim 9, wherein the at least two sides include two sides that are substantially perpendicular to one another.

11. The method of claim 9, wherein control logic is disposed along an axis of each interface block, and wherein arranging at least one interface block on each of the at least two sides includes rotating an orientation of an axis of a first interface block by 90 degrees with respect to an orientation of an axis of a second interface block.

12. The method of claim 11, wherein the internal I/O circuits and the external I/O circuits of the first interface block and the internal I/O circuits and the external I/O circuits of the second interface block have a common poly orientation.

13. The method of claim 11, wherein the internal I/O circuits and the external I/O circuits of the first interface block and the internal I/O circuits and the external I/O circuits of the second interface block have a different poly orientation.

14. An integrated circuit comprising:
core logic;
a plurality of interface blocks disposed about a periphery of the core logic; and
a plurality of input or output (I/O) circuits assigned to one of the plurality of interface blocks, wherein the I/O circuits comprise external I/O circuits adapted to be coupled to a device other than the integrated circuit and internal I/O circuits adapted to be coupled to the integrated circuit;
wherein each interface block includes:
a first plurality of I/O circuits disposed on a first side of the interface block and a second plurality of I/O circuits spaced apart from the first plurality of I/O circuits and disposed on a second side of the interface block opposite the first side of the interface block, the first plurality of I/O circuits and the second plurality of I/O circuits defining an exterior of the interface block;
interface logic for the interface block, the interface logic comprising a region located between the first plurality of I/O circuits and the second plurality of I/O circuits, said region defining an interior of the interface block; and
a logic hub of the interface logic located at the interior of the interface block, the logic hub including a clock distribution of minimal length that distributes clock signals from the interior of the interface block toward the first plurality of I/O circuits and the second plurality of I/O circuits at the exterior of the interface block, the clock signals to drive launch logic and capture logic to and from the I/O circuits of the interface block.

15. The integrated circuit of claim 14, wherein each interface block occupies a substantially rectangular area of the integrated circuit.

16. The integrated circuit of claim 14, wherein each interface block occupies a substantially square area of the integrated circuit.

17. The integrated circuit of claim 14, wherein at least one of the external I/O circuits includes an electrostatic discharge circuit.

18. The integrated circuit of claim 17, wherein none of the internal I/O circuits includes an electrostatic discharge circuit.

19. The integrated circuit of claim 14, wherein for each interface block, a plurality of I/O circuits of the interface block comprise interior elements on an interior side of the I/O circuit near an axis of the interface block, and exterior elements on an exterior side of the I/O circuit opposite both the interior side and the axis.

20. The integrated circuit of claim 19, wherein the plurality of interface blocks are arranged such that an exterior side of a first interface block is adjacent an exterior side of a second interface block.

21. The integrated circuit of claim 14, wherein for at least one interface block:
the first plurality of I/O circuits on the first side of the interface block comprise interior elements on an interior side of the I/O circuit near an axis of the interface block, and exterior elements on an exterior side of the I/O circuit opposite both the internal side and the axis; and
the second plurality of I/O circuits on the second side of the interface block comprise interior elements on an interior side of the I/O circuit near the axis of the interface block, and exterior elements on an exterior side of the I/O circuit opposite both the internal side and the axis.

22. The integrated circuit of claim 14, wherein the core logic is disposed within an area defined by at least two sides, and at least one interface block is arranged on each of the at least two sides.

23. The integrated circuit of claim 22, wherein the at least two sides include two sides that are substantially perpendicular to one another.

24. The integrated circuit of claim 22, wherein control logic is disposed along an axis of each interface block, and an orientation of an axis of a first interface block is rotated by 90 degrees with respect to an orientation of an axis of a second interface block.

25. The integrated circuit of claim 24, wherein the internal I/O circuits and the external I/O circuits of the first interface block and the internal I/O circuits and the external I/O circuits of the second interface block have a common poly orientation.

26. The integrated circuit of claim 24, wherein the internal I/O circuits and the external I/O circuits of the first interface block and the internal I/O circuits and the external I/O circuits of the second interface block have a different poly orientation.

* * * * *